United States Patent
Blazevic (10) Patent No.: US 10,607,436 B1
(45) Date of Patent: Mar. 31, 2020

(54) PLAYING CARD, CHIP OR DICE READING GAMING TABLE SYSTEM

(71) Applicant: Mladen Blazevic, New York, NY (US)

(72) Inventor: Mladen Blazevic, New York, NY (US)

( * ) Notice: Subject to any disclaimer, the term of this patent is extended or adjusted under 35 U.S.C. 154(b) by 0 days.

(21) Appl. No.: 16/154,712

(22) Filed: Oct. 8, 2018

(51) Int. Cl.
| | |
|---|---|
| *A63F 13/00* | (2014.01) |
| *G07F 17/32* | (2006.01) |
| *H04N 5/33* | (2006.01) |
| *G06F 3/03* | (2006.01) |
| *A63F 3/00* | (2006.01) |
| *A63F 9/24* | (2006.01) |
| *A63F 13/213* | (2014.01) |
| *A63F 1/06* | (2006.01) |

(52) U.S. Cl.
CPC ........ *G07F 17/3209* (2013.01); *G06F 3/0325* (2013.01); *G07F 17/322* (2013.01); *G07F 17/3211* (2013.01); *H04N 5/332* (2013.01); *A63F 1/067* (2013.01); *A63F 3/00157* (2013.01); *A63F 13/213* (2014.09); *A63F 2003/0017* (2013.01); *A63F 2003/00164* (2013.01); *A63F 2003/00167* (2013.01); *A63F 2009/2435* (2013.01); *A63F 2009/2454* (2013.01); *A63F 2250/58* (2013.01); *A63F 2300/1087* (2013.01)

(58) Field of Classification Search
CPC .. A63F 2003/00164; A63F 2003/00167; A63F 2003/0017; A63F 3/00157; A63F 1/067; A63F 2250/58; A63F 2009/2435; A63F 2009/2454; A63F 13/213; A63F 2300/1087

USPC .......................................... 273/309, 237, 292
See application file for complete search history.

(56) References Cited

U.S. PATENT DOCUMENTS

| | | | |
|---|---|---|---|
| 8,969,802 B1 * | 3/2015 | Blazevic | A63F 1/12 250/330 |
| 2007/0021243 A1 * | 1/2007 | Fourie | A63B 59/00 473/518 |
| 2010/0009745 A1 * | 1/2010 | Stockdale | A63F 5/04 463/31 |
| 2011/0111840 A1 * | 5/2011 | Gagner | G07F 17/32 463/25 |
| 2014/0094256 A1 * | 4/2014 | Hilbert | G07F 17/3211 463/20 |

(Continued)

*Primary Examiner* — Benjamin Layno
(74) *Attorney, Agent, or Firm* — Mark A. Litman & Associates, P.A.

(57) ABSTRACT

A gaming table system for executing gaming events with physical playing cards or two dice having:
 a support layer with multiple functional layers, the multiple functional layers comprising a bottom table top layer, an intermediate padding layer and a top layout layer;
 beneath the support layer is an array of infrared-sensitive cameras having overlapping focal areas that cover all areas on a bottom surface of the support layer where playing cards are or dice are placed face down on the top layout layer during the gaming events;
 a source of infrared LED lighting having a projection area that covers all areas on the bottom surface of the support layer where playing cards are placed face down on the top layout layer;
 the array of infrared-sensitive cameras having a communication link to a processor; and
 the support layer being translucent to infrared emissions from the source of infrared LED lighting.

19 Claims, 2 Drawing Sheets

(56) References Cited

U.S. PATENT DOCUMENTS

2016/0012662 A1\* 1/2016 Jackson ................ G07F 17/322
463/46

\* cited by examiner

PLAYING CARD, CHIP OR DICE READING GAMING TABLE SYSTEM

BACKGROUND OF THE INVENTION

1. Field of the Invention

The present invention relates to the field of gaming tables and particularly playing card gaming tables with card-reading capability.

2. Background of the Art

Gaming tables with game-specific printing on their surfaces are standard systems in the gaming industry. These tables are used for many wagering systems, including playing card games, dice games, roulette systems and candy wheel games. The majority of table games are playing card games such as baccarat, blackjack (twenty-one), and poker variants. There can be significant activity and gaming element movement on the playing card gaming tables, including multiple rounds of card movement including multiple cards with each step of game play, card delivery to multiple player positions and a dealer position, wagering chip movement and additions and the like. This complex movement of gaming elements on the game table surface makes automated management and security surveillance of the gaming operation difficult.

Many different types of systems have been proposed, with various degrees of accuracy and efficiency. Two systems by the inventor have proven to be outstanding systems for improving security and player management as U.S. Pat. No. 9,721,421 (Electronic Gaming System with Physical Gaming Chips and Wager Display) and U.S. Pat. No. 8,969,802 (Playing Card Imaging Technology with Through-the-Card Viewing Technology). Even with the quality of these systems, further improvements such as those disclosed and enabled herein are still necessary.

SUMMARY OF THE INVENTION

A gaming table system for executing gaming events with physical playing cards includes:
a) a support layer comprising multiple functional layers, the multiple functional layers including a bottom table top layer, an intermediate padding layer and a top layout layer;
b) beneath the support layer is an array of infrared-sensitive cameras having overlapping focal areas that cover all areas on a bottom surface of the support layer where playing cards are placed face down on the top layout layer;
c) beneath the support layer are a source of infrared LED lighting having a projection area that cover all areas on the bottom surface of the support layer where playing cards are placed face down on the top padding layer;
d) the array of infrared-sensitive cameras having a communication link to a processor with memory that stores images of faces on playing cards lying on the top padding layer; and
e) the support layer being translucent to infrared emissions from the source of infrared LED lighting.

DETAILED DESCRIPTION OF THE INVENTION

The following is both a general and specific description enabling aspects of the present invention.

The system operates by using a camera under a playing surface of a gaming table, particularly a playing card gaming table using physical playing cards. The general operation of the system has the playing card surface comprise a support and a cover layer, such as a structural support layer and an informational display surface, such as those typically used on gaming table surfaces, usually referred to as felts. These felts have information on their surface (usually by printing) and are typically with a uniform background color. There is a camera sensitive to infrared radiation (e.g., between 820-1000 nm, or preferably 860-960 nm, and more preferably between 880-940 nm) under the playing surface of the gaming table. Playing cards are often placed on the gaming table surface with their playing face (with suits and ranks on them) face down on the gaming surface. It is desirable for the casino or an electronic system to be able to read the suits and ranks of cards without prematurely disclosing cards, such as when players are in competition with other players, or before players want their cards disclosed. The system must have components and functionalities that enable successful operation of any intelligent system.

Therefore, with the informational faces of the playing cards having to be read by the infrared camera under the game playing surface, the playing surface must be sufficiently transparent to infrared (IR) radiation for the camera to achieve reception of information and even provide images to a display device with sufficient definition in the image to provide visually or electronically readable image data so that suits and ranks can be read and/or displayed with an extremely high assurance level (for playing card games, 100% accuracy is important, and at least 99.9% accuracy is required for each card).

To enable that, the game playing surface must have sufficient transparency to IR to enable the camera to receive and convert the infrared image data. To implement this, the total IR transparency through the game playing surface (the support and the informational covering (felt)) must be sufficient for the mode of infrared radiation source used (as between ambient IR from incandescent or IR overhead bulbs or under the table IR lighting) for the camera and processor provide the needed accurate information.

For example, with an overhead lighting system, at least 15% of the ambient radiation to which the infrared camera is sensitive hitting the game play surface must pass through that surface and be received by the infrared sensitive camera. Similarly at least 15% of the ambient radiation to which the infrared camera is sensitive that is reflected down through the information face of the playing card (reflection off the interior surface of the playing card face back through the image printing on the information face of the playing card) must pass through that game play surface and be received and read by the infrared sensitive camera and the data from the camera is processed by the processor/computer.

The following is a more detailed description of the individual structural components of the invention.

The infrared sensitive camera can see from below the table, through a table top, padding and the informational content layout and can recognize a card laying on the top. The camera can recognize from below the table, through table top, padding and layout cards being dealt from a commercial, not necessarily intelligent plain dealing shoe.

The camera (or multiple cameras with at least some overlap of fields of view) can detect from below the table one chip on a main or side bet position, and (depending on type of dye used in manufacture of specific chips) recognize the value of that chip. It works with a majority of casino chips tested.

The camera can recognize (depending on type of dye used in manufacture of specific chip) from below the table, the value of a bottom chip in stack of chips.

All this can be done only with a camera built or positioned under the table and IR LEDs installed near the camera under the table. No other illumination or cameras are needed over the table.

If there is an IR radiation emitter desired over the table, this can be provided by regular incandescent light in the room or specially added IR illuminator, all the above described elements will work the same way, but with much less IR LEDs needed to be built under the table. IR LEDs from under the table would in this case be used only to illuminate chip from below, so that the camera can recognize at least a bottom chip value.

Recognition of the cards, detection of chips placed on main or side bets can also be detected using IR light coming from above the table, because IR light will penetrate cards, layout, padding and table top and will be then detected by camera filter, and at least detect the presence of chips on a side bet position (e.g., by excluding ambient light in the side bet position).

A chip will be detected because IR light coming from above the table will be blocked by chip laying on the main or side bet position, and this blocking will be detected by camera.

At the same time, IR LEDs from under the table, will illuminate chip from under, providing to camera information about chip value. If a visible light camera is added over the table, that camera could provide additional information about movements of the cards, such as to which position the cards will be dealt and 100% accuracy in recognizing the value of one chip on main or side bet position.

It would be beneficial to also have as an option of an additional visible camera over the table, to make things easier for operation of the whole system.

Infrared Video Camera

At least one or a few cameras with filtering ability are placed under the table top. The camera is able to see-through TABLE TOP, PADDING, LAYOUT and CARDS (or in the case of reflective reading, through the informational printing on the face of the playing cards) and therefore detect and recognize CARDS and at least one CHIP (only one per betting spot) laying on the gaming table.

A interesting aspect is that the system can also work with both light sources deployed in the same time: IR light from above and IR light from below—because of IR transparency of the TABLE TOP-PADDING-LAYOUT and the ability of the IR camera with filter to see through the TABLETOP-PADDING-LAYOUT. The TABLETOP-PADDING-LAYOUT comprises the physical support layer (as described in greater detail herein as the tabletop), the cushioning layer and/or barrier layer in direct contact with the tabletop (as described in greater detail herein as the padding) and the layer with printed information on it which is exposed to players and on which playing cards are deposited (as described in greater detail herein as the layout).

A reasonable range of descriptions of the general table structure can be provided herein as a gaming table system for executing gaming events with physical playing cards including:

a) a support layer comprising multiple functional layers, the multiple functional layers comprising a bottom table top layer, an intermediate padding layer and a top layout layer;

b) beneath the support layer is an array of infrared-sensitive cameras having overlapping focal areas that cover all areas on a bottom surface of the support layer where playing cards are placed face down on the top layout layer during the gaming events;

c) beneath the support layer are a source of infrared LED lighting having a projection area that cover all areas on the bottom surface of the support layer where playing cards are placed face down on the top layout layer;

d) the array of infrared-sensitive cameras having a communication link to a processor with memory that stores images of faces on playing cards lying on the top layout layer; and e) the support layer being translucent to infrared emissions from the source of infrared LED lighting.

In the gaming table system, at least 25% of the infrared emissions from the source of infrared LED lighting directed at faces on playing cards lying on the intermediate padding layer should pass through the support layer and sufficient infrared radiation to be read by the infrared-sensitive cameras should be reflected towards the array of infrared-sensitive cameras.

The gaming table should have the top layout layer with information printed thereon providing information provided to players about game content or game identification being executed on the gaming table system, and the information material (ink, dye, film, etc.) should not adversely affect the reflection and/or reading of the infrared radiation to be received by the infrared-sensitive cameras. The gaming table system should use a system wherein a majority of infrared radiation emitted by the source of infrared LED lighting is within a range of wavelengths between 720 to 1200 nm or 820 to 1000 nm or a system wherein a majority of infrared radiation emitted by the source of infrared LED lighting is within a range of wavelengths between 880 to 960 nm.

The gaming table will usually have the bottom table top layer, the intermediate padding layer and the top layout layer each made of one or more synthetic polymeric materials as films, sheets, foams, or fabrics. It may be one construction of the gaming table wherein the bottom table top layer (and any other segment of the table top layer) is an infrared-translucent polymer or preferably infrared transparent polymer (at least 75% transmission with less than 10 dispersion of infrared radiation between 820 and 1000 nm being disperse in a perpendicular path through the thickness of the polymer.

The gaming table may have each of the three layers (bottom table top layer, the intermediate padding layer and the top layout layer), including the bottom table top layer manufactured from a material selected from the group consisting of infrared radiation translucent (or transparent) polycarbonate polymer, infrared radiation translucent (or transparent) cyclic olefin polymer, infrared radiation translucent polyacrylate polymer, infrared radiation translucent (or transparent) silicone polymer and infrared radiation transparent (or transparent) polyurethane polymer. Another aspect of the present technology includes a gaming table system for executing gaming events with physical playing cards or at least two dice including:
  a) a support layer comprising multiple functional layers, the multiple functional layers comprising a bottom table top layer, an intermediate padding layer and a top layout layer;
  b) beneath the support layer is an array of infrared-sensitive cameras having overlapping focal areas that cover all areas on a bottom surface of the support layer where playing cards are placed face down on the top layout layer during the gaming events or at least two dice are placed on the top layout layer during the gaming events;
  c) a source of infrared LED lighting having a projection area that covers all areas on the bottom surface of the support layer where playing cards are placed face down on the top layout layer;
  d) the array of infrared-sensitive cameras having a communication link to a processor with memory that stores images of faces on playing cards lying on the top layout layer or dice pips lying on the top layout layer; and
  e) the support layer being translucent to infrared emissions from the source of infrared LED lighting.

The above gaming table may have or also have a source of infrared radiation which includes infrared-emitting sources above the support layer (as well or as an alternative to the under the table surface IR-emitters) and over the top surface of the top layout layer where playing cards are placed face down on the top layout layer during the gaming events.

Again, least 25% of the infrared emissions from the source of infrared LED lighting directed at playing cards lying on the top layout layer passes through the support layer and is transmitted towards the array of infrared-sensitive cameras.

The gaming tables should also be characterized as preferably as where the intermediate padding layer (and even every one of the three layers) is transparent to infrared radiation and causes less than 10% dispersion of infrared radiation passing perpendicularly through the intermediate padding layer (or each layer or the three layers collectively).

The gaming table may also have at least one or preferably at least two dice present on the top surface of the top layout layer and two infrared-sensitive cameras are used to read pips on a lowest surface of each the at least two dice. Two cameras are useful in covering each die as a perfectly vertical image would show both opposed faces of a die without providing easily differentiated data between the two faces. Two cameras offers a perspective that can determine which of the opposed faces is closest to the table, with the farthest face being the outcome face of the die.

Visible Spectrum Video Camera

At least one or a few cameras will be installed over the table on at least one separate camera holder, in a mini dome (eye-in-the-sky) or will be built into a table display bracket. The purpose of the visible light cameras is to provide (together with IR cameras from bellow) additional information about value of the chips and information about cards position. After the cards are dealt from dealer's hand, plain dealing shoe or smart dealing shoe, the system will be able to recognize:
  How many cards are dealt to players and dealer.
  To which positions additionally dealt cards or dice are going or are delivered.
  Value of a chip, or (in case of more than one chip) a top chip placed on side and main bet position.

Illumination

IR illumination for the System work can be provided by two ways (or a combination of the two ways, alone or combined):
  1. IR light source from over the table, using IR light coming from regular incandescent light source (which also emits some IR) or IR illuminator installed near visible spectrum video cameras.
  2. IR light source from under the table, using IR light from IR LEDs (light emitting diode) built in the table near infrared video cameras.

IR LEDs emitters should work in wavelength range of, for example, from 820-1000 nm, preferably 880 nm to 940 nanometers with a beam angle larger than 20 degrees from horizontal. To obtain the best possible image, computer software written specifically for this application will be able to process image data from the cameras (to recognize card and to recognize chip value), with a preferable element (besides general technical requirements listed above) as a positional grid, a layout of LEDs with recognizable positions of emission. The aspects of the positional grid (distance between individual LEDs and a number of LEDs per area of interest illuminated above) may depend on:
  Distance from LEDs to the cards and chips above.
  Type of table top material—how much it will transmit, absorb and reflect IR light.
  Type of padding material—how much IR it will transmit, absorb and reflect IR light, and
  Type of layout material—how much it will transmit and absorb IR light. Therefore, the LEDs' positional grid will be responsible to penetrate the table top, padding and felt, assure that there is not a sufficiently intense reflection effect from table top and padding above them to the camera near them, and illuminate any area of interest in best possible way in order to provide "processable" images to the software. A general procedure would be that border lines of LEDs area are approximately 35-50% smaller then border lines of areas of interest where cards and chips are lying on top of the table above LEDs.

The TABLE TOP can be made of a piece (continuous film or sheet, or discontinuous filed or sheet with polymer) positioned in strategic locations where cards are passed or of plastic polymer. For example, an acrylic, polyurethane or polycarbonate polymer sheet or film with a thickness from 0.6 cm to 2.6 cm (e.g., about ¼ to 1 inch or more. These materials have excellent IR light transparency in almost any color added to the film or sheet (as long as not a high IR absorbing dye or pigment is used, such as a dye or pigment that absorbs in excess of 80% or 90% of IR radiation), and they are stronger than normal window glass, wherein Acrylic is 10× stronger and Polycarbonate is 200× stronger.

It is common knowledge that clear plastic is one of the most popular materials used in manufacturing and design. However, there is a wide variety of these transparent polymers out there, and they can't always be used interchangeably. Plastic, after all, is a generic term for a large family of synthetic or semi-synthetic materials. For the most part, plastics can be put into two major categories: thermoplastics and thermosetting polymers. The former refers to plastics that can be melted and re-used after their initial formation without having their structure destroyed. The latter group does not have this property. Let's look at some of the key differences between the most popular kinds of clear plastics.

Acrylic materials are really an umbrella term used to refer to the kinds of thermoplastics that are petroleum based and created from the derivation of natural glass. Acrylic is also known as polyacrylate or polymethacrylate, and includes copolymers. There are quite a few brand names associated with acrylics, with Plexiglas probably being the most known one. Other brand names include du Pont's Lucite® and Evonik Cyro LLC's Acrylite®, in addition to Perspex®, Optix®, Altuglass® and Oroglass®.

Acrylics can be injection molded or hand crafted. The former is very similar to glass and is thus often used as an alternative to it in sunglasses, display risers and bakery bins. The material is strong and is also cheaper than their handcrafted counterparts. Hand crafted acrylics are relatively more upscale and usually used for displays. These are higher quality and extremely strong.

Polycarbonate is a clear thermoplastic that has high durability and can have optical quality. Polycarbonates are easy to mold and work, and so is used for a great many purposes, such as in the construction industry and the creation of safety glasses. It's more expensive than plexiglass, but also stronger and can also be bent at room temperature. Polycarbonate is available under brand names like Lexan® and Makrolon® Polycarbonates are associated with bullet proof glass since they're used to create the armored windows in airplanes and government vehicles. Unlike acrylic, however, polycarbonates tend to yellow when exposed to prolonged sunlight.

Another option is a piece of various materials (transparent or translucent to IR radiation) commonly used as material for counter tops: granite, quartz, laminate, recycled glass, marble, porcelain or other synthetic materials, all with more or less naturally good IR light transparency or translucency.

Still another option is a wooden or compressed cellulosic piece with holes cut under positions strategically placed for the cards: in front of dealing shoe, under dealers and players cards and/or under positions of the chips: main bets, side bets. Holes are covered with materials mentioned above for tabletops.

Padding

Different paddings may be used today for manufacture of tables for different casino games, but in general, besides simple obvious structural reasons, not much care is taken to select best possible solutions for specific use of paddings.

Among basic requirements for good performance characteristics of padding may be:

Ability of players and dealer to pick up cards, dice and chips easily by dealer or players.

Perfect dice and chip bounce, some bounce—but not too much.

When padding is covered with card table felt, cards must slide across the is table with ease—choice of padding material is very important.

Resistance to stains, mold and mildew caused by spilling liquids on the gaming table.

Tabletops for dice games have the most requirements of all gaming tables.

1. Dice shouldn't bounce too much, because they will often fly from the table.

2. Accordingly, the best surface would be piece of plywood or a rigid composite or polymeric or a slightly cushioned surface on which only layout would be tightly stretched.

3. This configuration would allow dealers to push with ease dice with croupier stick.

On a craps table, above configuration could create few additional problems. Crap dice have very sharp, razor edges, which can easily damage or wear out threads and then cut holes in expensive cloth stretched tight on a flat piece of plywood. It is difficult to pick up a chip on hard surface to take, pay and place wagers.

Therefore, a non-bouncing pad is placed between the layout cloth and the plywood, so the dice edges are softened, and softer surface make it easier for dealers to take, pay and place wagers.

With tables for card games, choice of padding materials generally depend on the type of the game: if the players are handling the cards, padding tend to be softer, if dealer is only one to handle the cards padding will be harder. There is also a security issues, because softer surface can make easier for players to "peek" into a dealer's hole card.

Tables for poker games use much softer pads, which makes cards easier to pick up by players and the dealer.

Casino tables manufacturing companies use few similar (only in sense of is general characteristic, not in chemical content) padding materials:

1. Polyethylene (PE) or Polypropylene (PP) Sheet or Foam or PE-PP Sheet or Foam

Polyethylene (PE or PP) foam is a firm, closed-cell foam. The polymer molecules may be cross-linked providing more rigidity, and therefore this foam is often referred to as "crosslink" or "crosslinked polyethylene" foam. The cross-link nature of this foam type causes it to try very hard to rebound to its original shape quickly, which has the effect of introducing a little bit of "bounce" in addition to offering shock absorption. Due to its rigidity, polyethylene does not distribute fall energy broadly. You could consider this a "shock repelling" foam.

Polyethylene (and polypropylene) is among the most widely used plastic polymers. Chemically, the structure of polyethylene is the simplest of all commercial polymers. It consists of a long chain of carbon atoms with two hydrogen atoms attached to each carbon atom.

Polyethylene Foam or Sheeting

Polyethylene foam is used in packaging when flexible foam is required but a firmer hold is needed. It is also used to cushion heavier parts due to its higher compression.

Volara® Polyethylene Foam

Volara® Type A is flexible, closed cell, polyethylene foam which is cross linked by using a unique electron irradiation process that results in a continuous, smooth surface. Volara® foam has excellent chemical resistance, low water absorption and vapor transmission, superb thermal insulation and a non-abrasive, aesthetically pleasing surface. Volara® foam is available in a 2 lb./ft3 density in both 0.125 inch and 0.25 inch thicknesses, and in black or white.

Crosslinked Polyethylene Foam

Cross Link Polyethylene is a type of polyethylene with tiny cells. It is commonly seen in athletic equipment such as gym mats and martial arts protective gear.

Polyurethane Foam

Polyurethane is a softer, open-cell type of foam that is made in varying degrees of firmness. Because the cells are open and not cross-linked, air can flow throughout the foam just like water can flow throughout a sponge. This characteristic makes the foam softer and gives it the ability to absorb shock energy better. It does not try to rebound as quickly as polyethylene, and it distributes the energy of the compression more broadly.

Polyurethane foam is commonly used as cushion foam in furniture, bedding and decorative pillows. It is also an ideal packaging material, typically used for shipping sensitive electronic equipment that needs maximum shock absorption.

Urethane Foam

CONFOR™ urethane foams offer a unique combination of physical characteristics, high-energy absorption properties, and temperature-softening behavior. The foams exhibit no silicone off-gassing and exert low force under high compression, making them ideal for shock protection and gasketing in electronics applications. Soft and flexible, the highly damped, slow-recovery materials contain no halogens or metal compounds.

Out of the two, polyurethanes are a bit tougher and harder than urethanes. Polyurethanes are used in paints for a better coating and shine. Some of the benefits of urethane over polyurethane are the low tooling costs, resistance to abrasion, durability in forms of plastics, load bearing and compression properties, good coefficient of friction, stability, maintenance of shape and size of the product, and resistance to ozone and oxygen. Polyurethane elastomers have the capability to bond well with metals and plastics. These compounds have a high resistance to the harshness of the environment. It is much stable against the effects of hydrocarbon solvents. Polyurethane also has good resistance to the oxidation levels.

Translucent Silicone Rubber.

Technically, silicone is considered as part of the elastomer family. But silicone is something of a hybrid between a synthetic rubber and a synthetic plastic polymer. Silicone can be used to make malleable rubber-like items, hard resins, and spreadable fluids. Other materials which have good IR light transparency ("good"—meaning, to provide "workable" clarity and intensity of illumination) are polyurethane foam and translucent/transparent polyurethane sheeting.

Polyurethane foams have some better performance characteristics than translucent silicon when used as padding for gaming table; also they are commercially available in varying degrees of stiffness.

Considering all requirements which have to be achieved in order to provide our task and built working System, a preferred padding material for our technology is a polyurethane foam.

Finally, if padding material must be firmly attached to the TABLE TOP, as with glue or fusion, where any material used for gluing must also be translucent or transparent to IR light.

Layout:

Desired performance characteristics for layouts to cover casino tables for card games include:
1. Cards must easily glide on top of fabric, making dealers job easier.
2. Acceptance to dyes used in digital printing process of printing layouts. Today, custom graphic playing surfaces are printed using the dye sublimation technique which uses a printer that infuses the ink into the playing surface material which allows for extreme detail, vibrant colors and a long lifespan.
3. Water and stain resistance, mold resistance, fire retardant.
4. Durability, ease of cleaning.

For poker tables three additional important properties include:
1. Pleasant (to touch) playing surface, generally softer and smoother then tables for other casino card games.
2. "Speed cloth" which allows cards to glide even easier than on other casino games, because of size of 10 Players Poker Table and distance from dealer to individual players position, which is much larger then on tables for other casino card games—Blackjack, Baccarat etc.
3. Extra resistance to spills and stains, because players sitting long hours on the table, drinking and eating on the table.

Table manufacturing companies generally use two materials developed specifically for the casino table layouts: polyester and nylon (polyamides). While nylon has a lower denier thickness than polyester does, it is inherently stronger than polyester on a weight-for-weight basis. This also means that nylon takes longer to dry than polyester does. The durability, mold resistance and ease of cleaning is very close between these two fabrics.

Nylon is a group of synthetic polymers known as thermoplastics or aliphatic polyamides, which are derived from petroleum. It was originally manufactured as an alternative to silk, but its first commercial application was for toothbrush bristles in 1938 followed by women's stockings in 1940. During WWII, nylon was used extensively by the military and was difficult to obtain by the general public. Today, nylon remains one of the most commonly used fabrics in the world, second only to cotton. Also, being fabric, nylon can be condensed into a hard but flexible solid to be used for mechanical parts, gears, hair combs and other items. Nylon is made through a chemical reaction in a process known as ring-opening polymerization. The molecules of the raw materials from which nylon is made are in ring form. But a chemical reaction, usually between adipoyl chloride and hexamethylene diamine causes the rings to open and flatten into curly strings that bond to one another.

"Suited" Speed Cloth Made from Polyester

This is a decorative playing surface having low contrast images of spades, hearts, diamonds and clubs on a background. The low contrast is implemented by having different densities of a similar color for the print of the images against a background, which may be a check pattern.

Gaming suede can be made from polyester. The material is a polyester blend, made by adding softer fibers to polyester to create a softer feel (softer touch) while allowing the fabric to feel less like a plastic fabric, with only hard fibers.

Polyester Blends

Polyester is a synthetic material that is loved for being machine washable, wrinkle-resistant and low priced, Sometimes Polyester is blended with other fibers to create richer textiles, or to add some stretch for added built-in ease in fashion apparel garments.

Gaming Suede Made from Nylon

It is more durable and stronger, other characteristics are the same as polyester.

Table Felt Velveteen

VELVETEEN is made from Polyester or Nylon "blended materials", by adding softer fibers to polyester, in order to create "softer" material with much less "plastic" feel and if necessary, even, ultra-soft luxurious feel.

Figure 1:
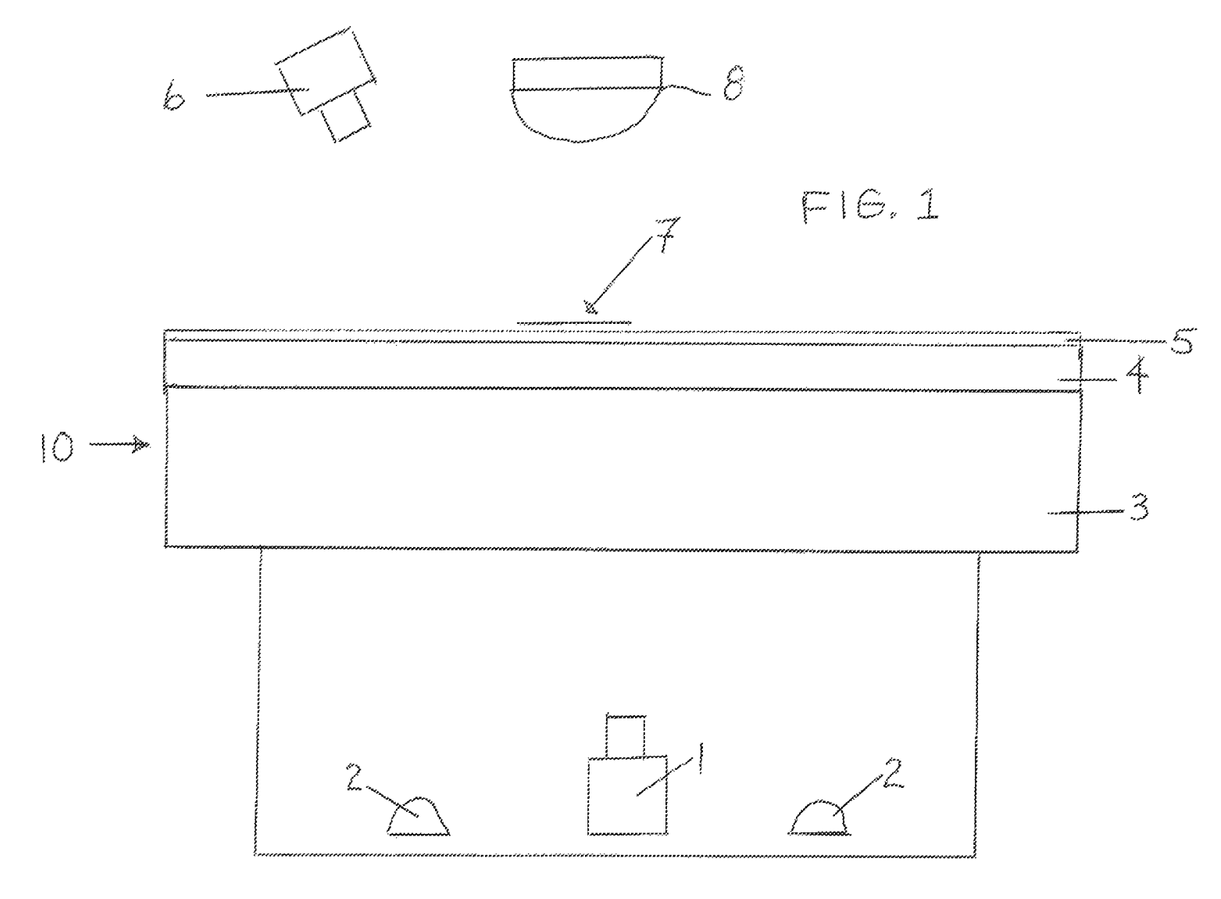
FIG. 1 shows a side view of a three-layer gaming table surface with both an infrared-sensitive camera and infrared radiation emitter below the gaming table surface (and an optional above the table surface infrared emitting source.

FIG. 1 shows a side view of a three-layer gaming table surface with both an infrared-sensitive camera and infrared radiation emitter below the gaming table surface (and an optional above the table surface infrared emitting source.

FIG. 1 shows a side view of a three-layer gaming table surface 10 having a bottom structural support layer 3, an intermediate padding layer 4 and a top layout surface layer 5. An infrared sensitive camera 1 and two infrared emitters 2 (LED infrared emitters or IR incandescent bulbs). A playing card or chip 7 is on the top layout surface layer 5. Alternatively or additionally, an overhead infrared-sensitive camera 6 or an "eye-in-the-sky" camera 8 may be used to capture the transmitted or reflected infrared image content.

Figure 2:
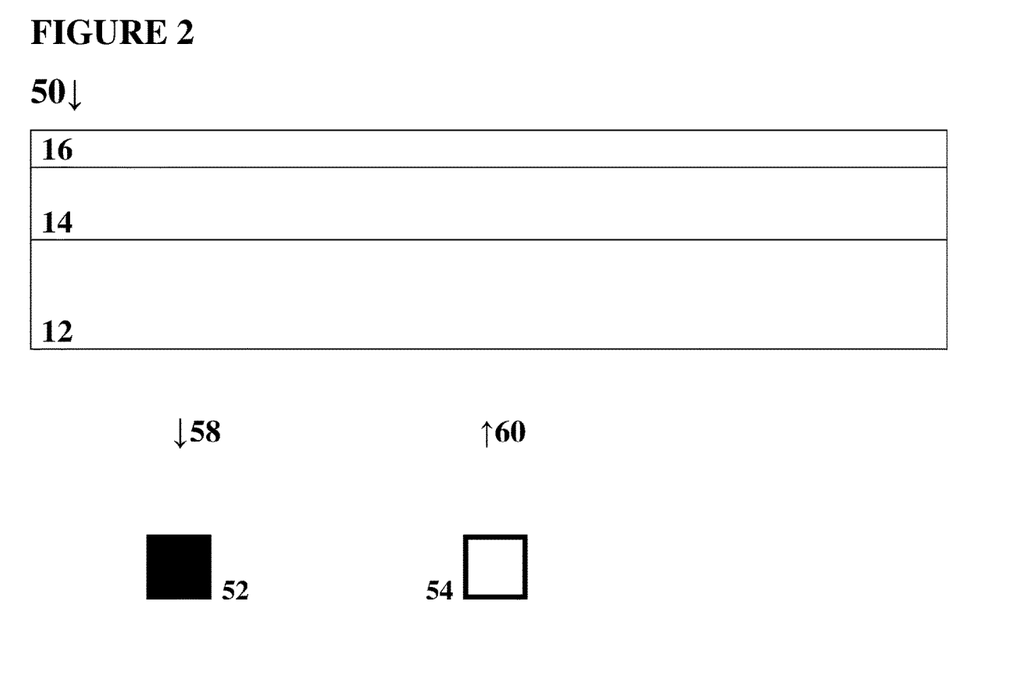
FIG. 2 shows a side view of a three-layer gaming table surface with both an infrared-sensitive camera and infrared radiation emitter below the gaming table surface (and an optional above the table surface infrared emitting source.

FIG. 2 shows a side view of a three-layer gaming table surface 50 with both an infrared-sensitive camera 52 (with the direction of received transmitted or reflected radiation shown as 58) and infrared radiation emitter 54 (with its direction of emission shown as 60) below the gaming table surface (and an optional above the table surface infrared emitting source 56).

The present specification provides broad and specific materials and parameters for the practice of the present technology, which should be considered as enabling a generic concept which is not limited by individual species disclosed. For example, the support layer having multiple functional layers, the multiple functional layers comprising a bottom table top layer) of from 1 to 30 mm), an intermediate padding layer (of from 1-30 mm) and a top layout layer of from 1 to 10 mm) may be thicker or thinner as properties of available materials may change.

For our purpose, beside any obvious requirements for best performance characteristics and security—the most interesting aspect are the specific optical properties of material used for padding—how material behave when exposed to IR radiation—transmission, absorption and reflection of IR.

After testing different materials which are presently used and which could be used for padding, because they have desirable properties (softness-firmest) for gaming tables, we find out that almost all tested materials allow significant amounts of infrared light radiation to pass through them unless they contain IR-absorbing dyes or pigments, including carbon black.

Because of the penetrating power of IR light, sensitivity of IR cameras with filters which filter specific part of the spectrum and chemical and optical properties of chosen material, it is possible to detect IR radiation passing through almost any of above materials and therefore use this fact to detect cards, dice and chips laying on top of the gaming table.

But in order to recognize cards, chips and/or dice and create perfectly working system, all elements of the present system have to be fine-tuned to provide best possible image quality to software which will be created to process obtained information.

This will be done by creating the right combination of:
1. MATERIALS used: table top, padding, layout.
2. CHOICE OF ILLUMINATION from above and from bellow the table.
3. CAMERA performance: infrared sensitivity, resolution, optics, filtering part of the spectrum which contains the most useful information for software algorithm.

All these parameters are closely related and depend on each other to create the best possible workable system. For example:

Penetrating power of IR light and choice of illumination—to provide is "workable" light condition which can be procced by processing algorithm, can be fine-tuned by:
1. Wavelength on which LEDs operate: lower wavelength radiation (880 nm) penetrate better certain tested materials—higher wavelength (940) works better with other materials which were tested.
2. Raising or lowering output power of radiating LEDs.
3. Adjusting the positional grid or array of LEDs in the installation: more dense positioning will produce stronger penetration, but could also create too dense spots of light concentration, while objective is to illuminate target areas with even, soft illumination which software program will be able to process.
IR LEDs Used for Illumination from Under the Table:
Wavelength: from 820-1200 nm, preferably from 840-940 nanometers.
Beam angle: from 20-130 degrees.
Forward voltage: from 1.4 to 1.6 volts.
Forward current: from 100 to 1.500 mA.

Depending on the surface area of the Table Top, Padding and Layout, transmit, absorb and reflect IR light, IR LEDs with wavelength emitting from 840 to 960 will be chosen.

Depending on the surface area of the Table Top, Padding and Layout, transmit, absorb and reflect IR light, IR LEDs beam width will be chosen: anywhere from 20 degrees to 130 degrees.

Depending on the useful surface area of the Table Top, Padding and Layout, transmission, absorption and reflection of IR light, radiant power of LEDs will be chosen: forward current will be chosen from anywhere from 100 mA to 1500 mA.

For example:
Certain configuration of materials used for Table Top, Padding and Layout, will is work well with following choice of IR illumination:
Wavelength: 850 nm
Beam angle: 100 degrees (±50 degrees)
Forward current: 300 mA But, if we have to use a different IR wavelength, for example 940 nm, because of different configuration and specifics of transmittance, absorption and reflectiveness of Table Top, Padding and Layout materials, we would likely increase forward current, because longer wavelength IR LED are less efficient in radiated power, and we would choose different (narrower) beam angle and use more emitters.

For example, such IR led would have (approximately) following specifications in order to provide necessary information to camera (similar to first configuration):
Wavelength: 940 nm
Beam angle: 60 degrees
Forward current: 700 mA Therefore, depending on how large the surface area is for the Table Top, Padding and Layout, the parameters for transmission, absorption and reflection of the IR light and the IR LED illumination will be considered by taking into consideration characteristics of specific IR LED: wavelength, angle of radiation and current.

Illumination from Over the Table:
Any incandescent light source or additional commercial IR Illuminator can be used.

IR Camera—
Cameras are an important part of the System and few different cameras can be used.

Typical analog B&W camera would have following necessary requirements: ⅓' to ½" CCD chip with minimum horizontal resolution of 420 TV lines and minimum illumination of 0.03 LUX/Face Plate.

Another type could be USB CMOS, mono, 0.3 MP, with 752×480 resolution. IR Filter: choice of Infrared Wratten Filter will be decided by wavelength of IR LED used, so Kodak Wratten filters: 87, 87C, 87B, 87A will be chosen.

Choice of optics will be decided by an average distance from the camera lens to the card-chip-dice laying on layout and on the size of desired area of interest for image capture.

What is claimed:
1. A gaming table system for executing gaming events with physical playing cards comprising:
   a) a support layer comprising multiple functional layers, the multiple functional layers comprising a bottom table top layer, an intermediate padding layer and a top layout layer;
   b) beneath the support layer is an array of infrared-sensitive cameras having overlapping focal areas that cover all areas on a bottom surface of the support layer where playing cards are placed face down on the top layout layer during the gaming events;
   c) beneath the support layer are a source of infrared LED lighting having a projection area that cover all areas on the bottom surface of the support layer where playing cards are placed face down on the top padding layer;

d) the array of infrared-sensitive cameras having a communication link to a processor with memory that stores images of faces on playing cards lying on the top padding layer; and e) the support layer being translucent to infrared emissions from the source of infrared LED lighting, and wherein the bottom table top layer, the intermediate padding layer and the top layout layer each comprise synthetic polymeric materials and wherein the bottom table top layer is selected from the group consisting of infrared radiation translucent polycarbonate polymer, infrared radiation translucent cyclic olefin polymer, infrared radiation translucent polyacrylate polymer, infrared radiation translucent silicone polymer and infrared radiation transparent polyurethane polymer.

2. The gaming table system of claim 1 wherein at least 25% of the infrared emissions from the source of infrared LED lighting directed at faces on playing cards lying on the intermediate padding layer passes through the support layer and is reflected towards the array of infrared-sensitive cameras.

3. The gaming table of claim 2 wherein the top layout layer has information printed thereon providing information provided to players about game content or game identification being executed on the gaming table system.

4. The gaming table system of claim 3 wherein a majority of infrared radiation emitted by the source of infrared LED lighting is within a range of wavelengths between 880 to 960 nm.

5. The gaming table of claim 4 wherein the bottom table top layer, the intermediate padding layer and the top layout layer each comprise synthetic polymeric materials.

6. The gaming table of claim 5 wherein the intermediate padding layer comprises an infrared-translucent polymer.

7. The gaming table of claim 6 wherein the intermediate padding layer is selected from the group consisting of infrared radiation infrared radiation translucent polycarbonate polymer, translucent cyclic olefin polymer, infrared radiation translucent polyacrylate polymer, infrared radiation translucent silicone pol and infrared radiation transparent polyurethane.

8. The gaming table of claim 7 wherein the source of infrared radiation comprises infrared-emitting sources above the support layer and over the top surface of the top layout layer where playing cards are placed face down on the top layout layer during the gaming events.

9. The gaming table of claim 8 wherein the intermediate padding layer is transparent to infrared radiation and causes less than 10% dispersion of infrared radiation passing perpendicularly through the intermediate padding layer.

10. The gaming table of claim 7 wherein at least two dice are present on the top surface of the top layout layer and two infrared-sensitive cameras are used to read pips on a lowest surface of each the at least two dice.

11. The gaming table of claim 7 wherein the top layout layer comprises a layer consisting essentially of a layer selected from the group consisting of a polyester layer and a polyamide layer.

12. The gaming table of claim 5 wherein the intermediate padding layer comprises an infrared-translucent polymer.

13. The gaming table of claim 5 wherein the intermediate padding layer is selected from the group consisting of infrared radiation infrared radiation translucent polycarbonate polymer, translucent cyclic olefin polymer, infrared radiation translucent polyacrylate polymer, infrared radiation translucent silicone polymer and infrared radiation transparent polyurethane.

14. The gaming table of claim 13 wherein the top layout layer comprises a layer consisting essentially of a layer selected from the group consisting of a polyester layer and a polyamide layer.

15. The gaming table system of claim 2 wherein a majority of infrared radiation emitted by the source of infrared LED lighting is within a range of wavelengths between 820 to 1000 nm.

16. The gaming table of claim 15 wherein the bottom table top layer, the intermediate padding layer and the top layout layer each comprise synthetic polymeric materials.

17. The gaming table of claim 15 wherein the intermediate padding layer is transparent to infrared radiation and causes less than 10% dispersion of infrared radiation passing perpendicularly through the intermediate padding layer.

18. A gaming table system for executing gaming events with physical playing cards or at least two dice comprising:

a) a support layer comprising multiple functional layers, the multiple functional layers comprising a bottom table top layer, an intermediate padding layer and a top layout layer;

b) beneath the support layer is an array of infrared-sensitive cameras having overlapping focal areas that cover all areas on a bottom surface of the support layer where playing cards are placed face down on the top layout layer during the gaming events or at least two dice are placed on the top layout layer during the gaming events;

c) a source of infrared LED lighting having a projection area that covers all areas on the bottom surface of the support layer where playing cards are placed face down on the top layout layer;

d) the array of infrared-sensitive cameras having a communication link to a processor with memory that stores images of faces on playing cards lying on the top layout layer or dice pips lying on the top layout layer; and f) the support layer being translucent to infrared emissions from the source of infrared LED lighting, and e) wherein the bottom table top layer, the intermediate padding layer and the top layout layer each comprise synthetic polymeric materials and wherein the bottom table top layer is selected from the group consisting of infrared radiation translucent polycarbonate polymer, infrared radiation translucent cyclic olefin polymer, infrared radiation translucent polyacrylate polymer, infrared radiation translucent silicone polymer and infrared radiation transparent polyurethane polymer.

19. The gaming table system of claim 18 wherein at least 25% of the infrared emissions from the source of infrared LED lighting directed at faces on playing cards lying on the intermediate padding layer passes through the support layer and is reflected towards the array of infrared-sensitive cameras.

* * * * *